(12) United States Patent
Chen et al.

(10) Patent No.: US 7,640,452 B2
(45) Date of Patent: Dec. 29, 2009

(54) METHOD FOR RECONSTRUCTING DATA IN CASE OF TWO DISK DRIVES OF RAID FAILURE AND SYSTEM THEREFOR

(75) Inventors: Yi-Chun Chen, Taipei (TW); Kun-Ta Tsai, Taipei (TW)

(73) Assignee: QNAP Systems, Inc., Shi-Chih, Taipei Hsien (TW)

( * ) Notice: Subject to any disclaimer, the term of this patent is extended or adjusted under 35 U.S.C. 154(b) by 456 days.

(21) Appl. No.: 11/524,934

(22) Filed: Sep. 22, 2006

(65) Prior Publication Data
US 2008/0126840 A1   May 29, 2008

(30) Foreign Application Priority Data
Jul. 28, 2006   (TW) .............................. 95127648 A

(51) Int. Cl.
*G06F 11/00* (2006.01)
(52) U.S. Cl. ............................................ 714/6; 714/43
(58) Field of Classification Search ...................... 714/6, 714/43
See application file for complete search history.

(56) References Cited

U.S. PATENT DOCUMENTS

| | | | | |
|---|---|---|---|---|
| 7,237,062 | B2 * | 6/2007 | Lubbers et al. | 711/114 |
| 2005/0283654 | A1 * | 12/2005 | Wood et al. | 714/7 |
| 2005/0283655 | A1 * | 12/2005 | Ashmore | 714/7 |

\* cited by examiner

*Primary Examiner*—Scott T Baderman
*Assistant Examiner*—Jigar Patel
(74) *Attorney, Agent, or Firm*—Winston Hsu

(57) ABSTRACT

The present invention is to provide a method for reconstructing data in case of failure of two HDs of a RAID, wherein the RAID is a logical disk drive assembly including at least three HDs and a RAID controller and data is divided into block strips which are stored on data blocks of different HDs respectively. The method comprises the steps of reading super blocks of all of the HDs; comparing the number of the HDs and time being involved in a previous operation and stored in the super blocks with each other; reading common data involved in the previous degraded operation of the RAID; writing the read common data into the super blocks of all of the HDs; and recovering a configuration of the RAID to the degraded mode again.

14 Claims, 10 Drawing Sheets

METHOD FOR RECONSTRUCTING DATA IN CASE OF TWO DISK DRIVES OF RAID FAILURE AND SYSTEM THEREFOR

FIELD OF THE INVENTION

The present invention relates to techniques for reconstructing data in case of RAID failure and more particularly to a method for reconstructing data in case of the failure of two hard disks (HDs) in a RAID (Redundant Array of Independent Disks) and system therefor with improved characteristics.

BACKGROUND OF THE INVENTION

Conventionally, a RAID (Redundant Array of Independent Disks) system comprises a RAID controller for configuring a plurality of HDs (hard disks) as a virtual HD of very high capacity by hardware or software. Principles of storing data adopted by RAID system utilizes the method by dividing data into bit strips or block strips (which is the dominant one) and storing block strips in data blocks of different HDs respectively. Thus, in case of any HD failure it is possible of reconstructing corruptive data by comparing data stored in parity blocks of other operating HDs with data stored in data blocks of the same and conducting XOR (Xclusive OR) operations. It is known that data is written into a plurality of read/write heads of the plurality of HDs in a very high rate in a RAID system. Further, data strips are stored on data blocks of different HDs. Thus, a RAID system has a feature of fault tolerant, thereby providing a highly reliable way of storing data.

A widely commercially available type of RAID system (e.g., RAID-5 (RAID Level 5)) is schematically shown in FIG. 1. The RAID system comprises three (3) HDs 11, 12, and 13 and a RAID controller (not shown). An XOR gate of the RAID controller divides data 10 into a plurality of data blocks A, B, C, D, E, and F prior to storing data in the RAID system. The data blocks A and E are belonged to HD 11, the data blocks B and C are belonged to HD 12, and the data blocks D and F are belonged to HD 13 respectively. Also, CRC (cyclical redundancy check) is performed on data with corresponding parity blocks stored in different HDs 11, 12, and 13 in which a first parity block P contains data blocks C and D (i.e., P(C, D)) in the HD 11, a second parity block P contains data blocks E and F (i.e., P(E, F)) in the HD 12, and a third parity block P contains data blocks A and B (i.e., P(A, B)) in the HD 13 respectively. In a case of data block being defective on any HD (e.g., the HD 13), it is impossible of reading data from the failed HD as shown in FIG. 2. The RAID controller then recovers the RAID system into a degraded mode. Further, the RAID system may recess data from data blocks and parity blocks of the HDs 11 and 12. As shown in FIG. 3, the failed HD 13 is then replaced with a new HD 14. The RAID system is then reconstructed by the RAID controller by writing data into the new HD 14 by utilizing data in the data blocks A, B, C, and D and parity blocks P(C, D) and P(E, F) of the HDs 11 and 12. As a result, the RAID system can operate normally again.

It is also possible that there are two HD failures (e.g., the HDs 12 and 13) in the typical RAID system as shown in FIG. 4. The RAID controller is thus no longer capable of recovering the RAID system into a degraded mode if this occurs. As such, the task of reconstructing data of the failed HDs cannot be achieved, resulting in a crash of the RAID system. Thus, it is desirable among manufacturers of the art to provide a novel method for reconstructing data in case of two HDs of a RAID being failed and RAID system therefor in order to overcome the inadequacies of the prior art.

SUMMARY OF THE INVENTION

After considerable research and experimentation, a method for reconstructing data in case of RAID crash and system therefor according to the present invention has been devised so as to overcome the above drawback of the prior art (i.e., impossible of reconstructing data in case of two disk drives of the RAID being failed). In a case of the failure of two disk drives of the RAID, data stored in super blocks of all disk drives are employed to recover the RAID into a degraded mode, detect data of the defective data blocks, copy data of intact data blocks of the failed HDs into an external storage device, and sequentially record a location of the defective data block on the external storage device so as to reconstruct data.

It is an object of the present invention to implement a method to a RAID including both at least three HDs and a RAID controller, and data is divided into block strips stored on data blocks of different HDs respectively for reconstructing data in case of the failure of two HDs of the RAID. The method comprises the steps of reading super blocks of all of the HDs; comparing the number of the HDs and time being involved in a previous operation and stored in the super blocks with each other; reading common data involved in the previous degraded operation of the RAID; writing the read common data into the super blocks of all of the HDs; and recovering a configuration of the RAID into the degraded mode again.

In one aspect of the present invention the RAID in the degraded mode is adapted to perform steps comprising reading data from a failed one of the HDs; detecting a defective one of the data blocks of the failed HD; reading intact data from the data blocks of the failed HD and duplicating the same into the external storage device; and sequentially recording a location of the defective data block on the external storage device. By utilizing this, in case of two HDs of the RAID being failed it is possible of saving intact data of other HDs by utilizing the connected external storage device.

The above and other objects, features and advantages of the present invention will become apparent from the following detailed description taken with the accompanying drawings.

DETAILED DESCRIPTION OF THE PREFERRED EMBODIMENTS

Figure 1:
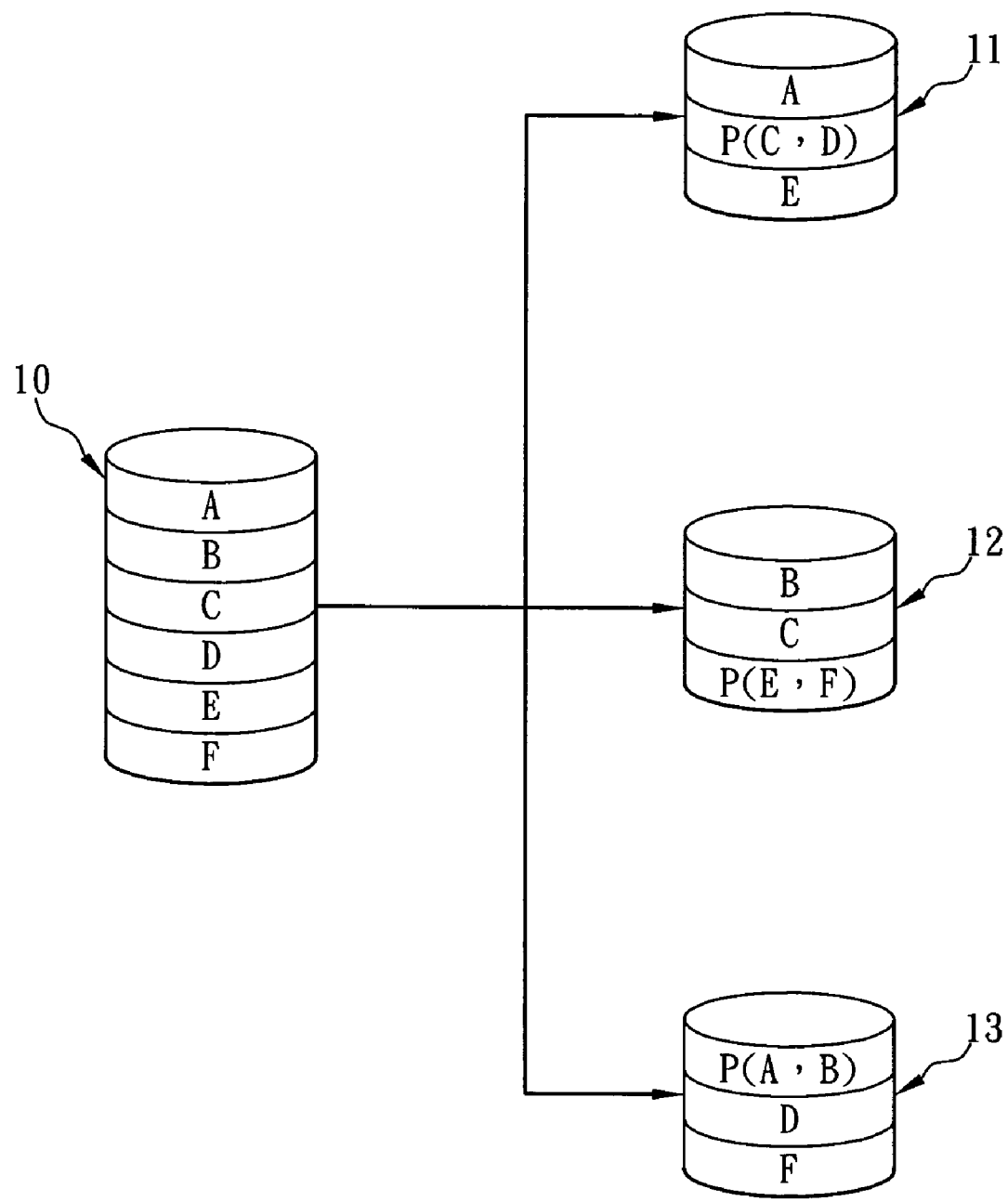
FIG. 1 schematically depicts a conventional RAID system including three normal HDs.
Figure 2:
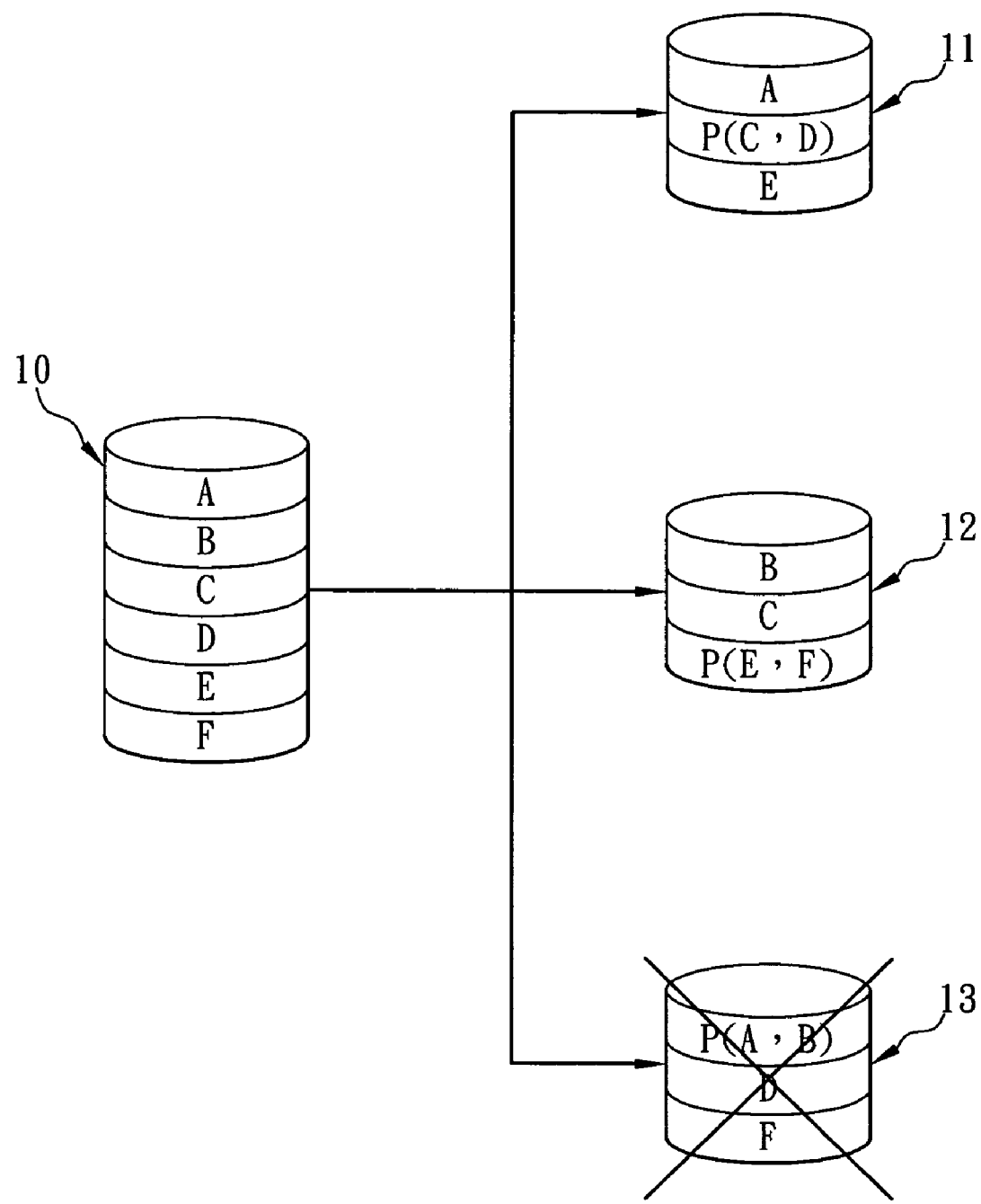
FIG. 2 schematically depicts one HD in FIG. 1 being failed.
Figure 3:
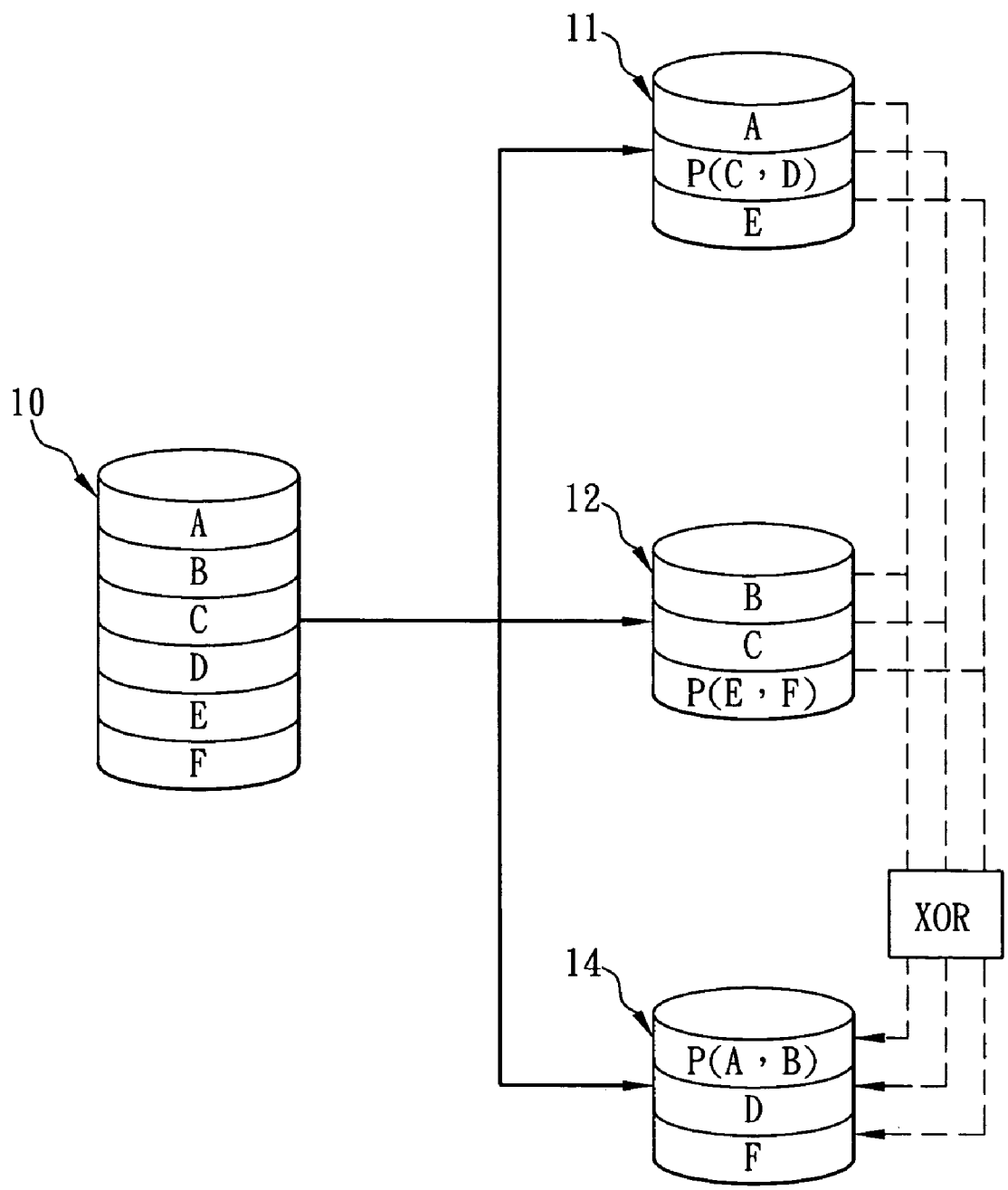
FIG. 3 schematically depicts a replacement of the failed HD in FIG. 2 with a new HD.
Figure 4:
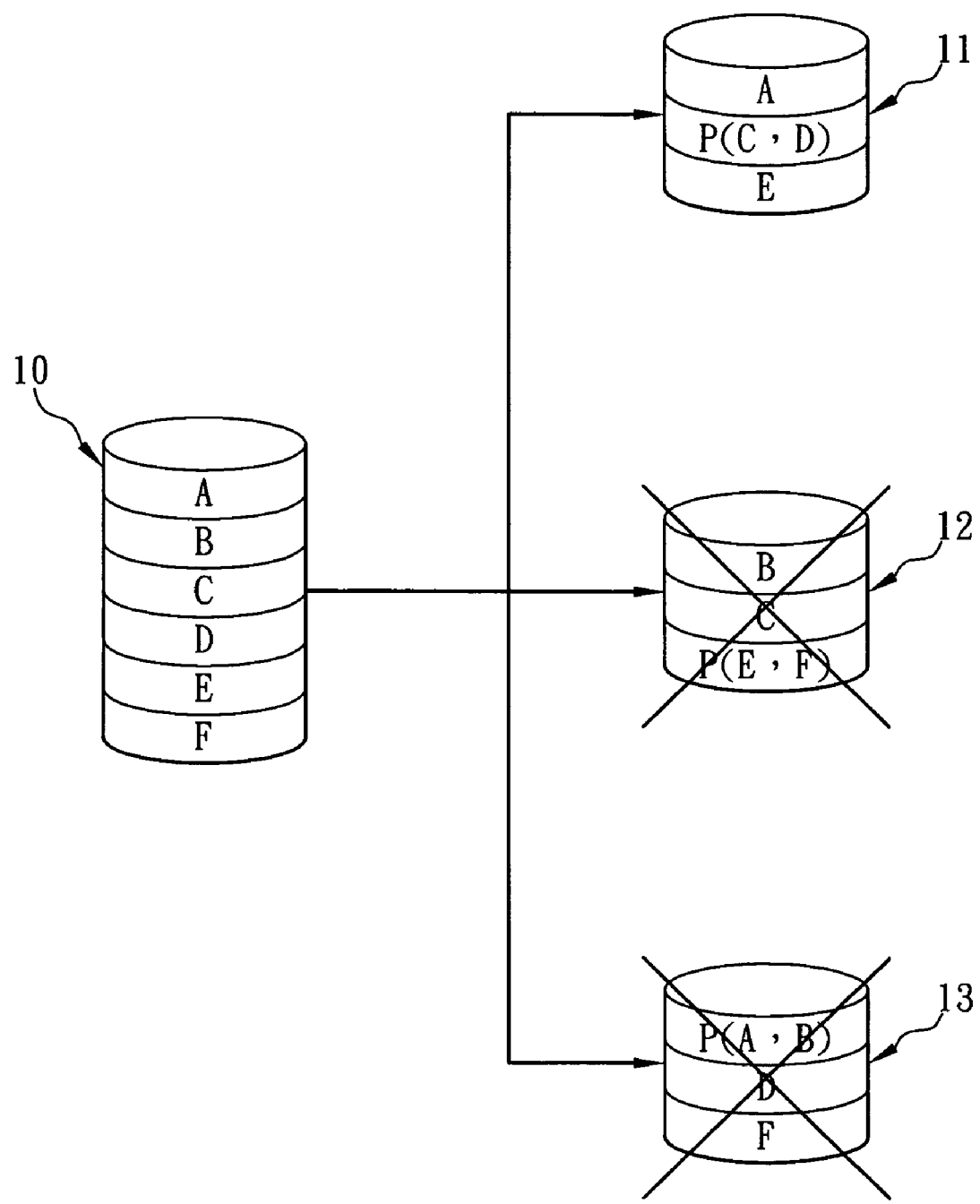
FIG. 4 schematically depicts two HDs in FIG. 1 being failed.
Figure 5:
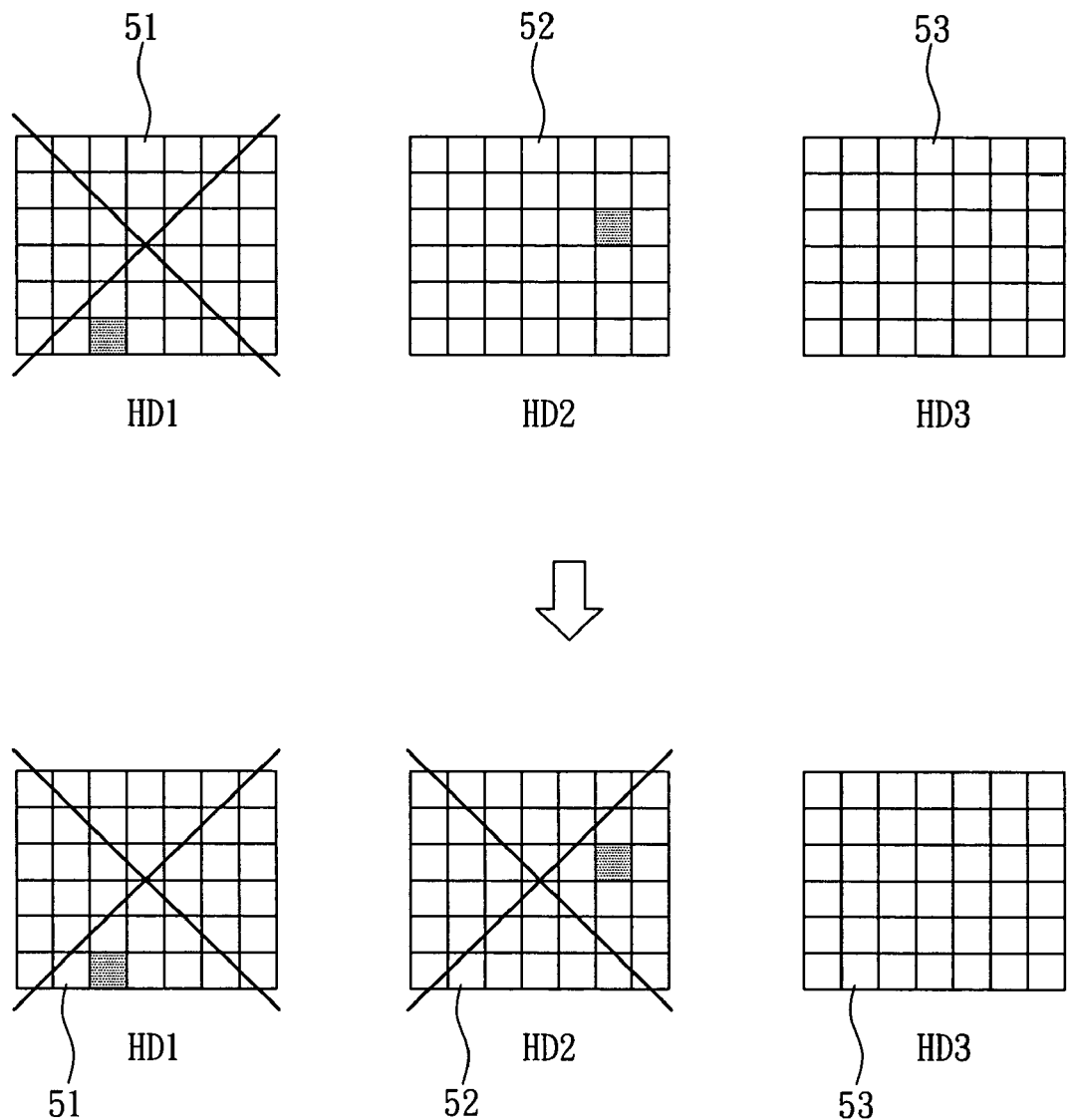
FIG. 5 schematically depicts a first preferred embodiment of RAID according to the invention where two HDs are failed.

The invention is directed to a method for reconstructing data in case of the failure of two disk drives of RAID. The method is implemented in a RAID (e.g., RAID-5 (RAID Level 5)) for reconstructing data in case of the failure of two HDs of the RAID is shown. The RAID implemented as a logical disk drive assembly comprises both at least three (3) HDs and a RAID controller. Data is divided into block strips and block strips are stored in data blocks of a different HDs respectively. Referring to FIG. 5, the RAID in accordance with a preferred embodiment of the invention comprises three (3) HDs. The principles and operations of the invention are detailed below.

Referring to FIG. 5 again, in the embodiment a first HD 51 of the RAID is assumed to fail. The RAID controller (not shown) then recovers the RAID into a degraded mode. The RAID may reconstruct data in the degraded mode. Unfortunately, a second HD 52 also fails at this time (i.e., only a second HD 53 operates normally). As a result, the RAID crashes. In response, an external storage device (e.g., HD, CD-ROM, or tape drive (not shown)) is connected to the RAID in the embodiment. The RAID then performs two procedures, namely super block recovery and saving intact data of any failed HD on the external storage device.

Figure 6:
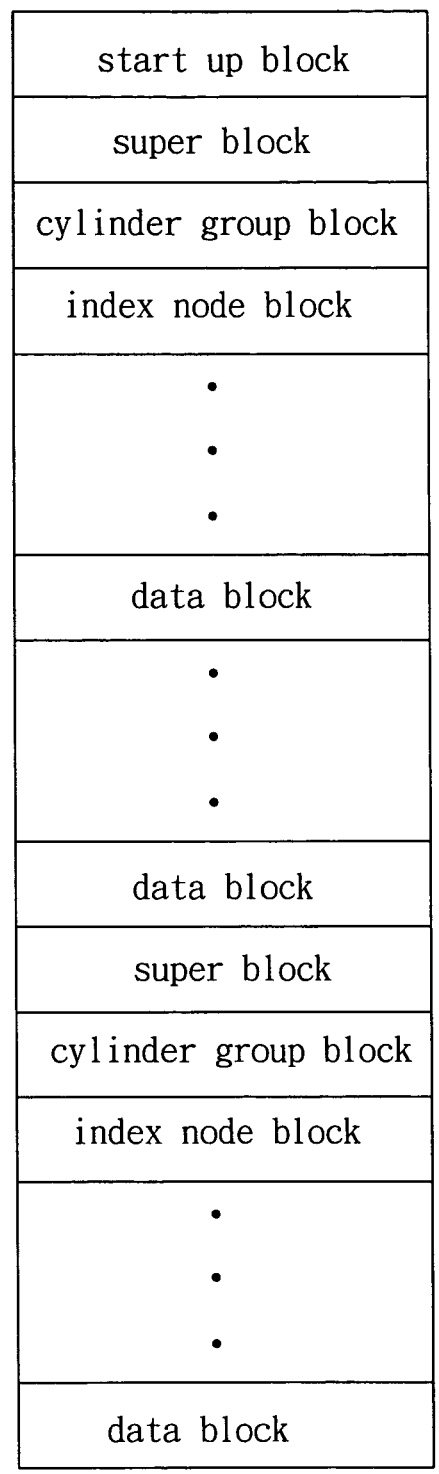
FIG. 6 schematically depicts structure of a plurality of cylinder groups obtained by dividing one of a plurality of partitions of a HD.

Referring to FIG. 6, in the embodiment each of a plurality of partitions of a HD is divided into a plurality of cylinder groups each including a number of cylinders in the range from 1 to 32 adjacent cylinders each including a super block, a cylinder group block, and an index node block. The cylinder group block indicates statuses of blank block of the cylinder group, blank index node data, and cylinder group operation. The super block occupies different spaces on each of a plurality of cylinder groups. For example, one super block is located at a first track and another super block is located at a second track. In general, the probability of all super blocks being failed is very small. Further, it is possible of reconstructing data of one defective super block by utilizing data stored in the super blocks in each HD in case of HD failure. Intact data of any failed HD due to defective data block is saved on the external storage device connected to the RAID. As an end, the task of reconstructing data of the failed HD can be achieved.

Figure 7:
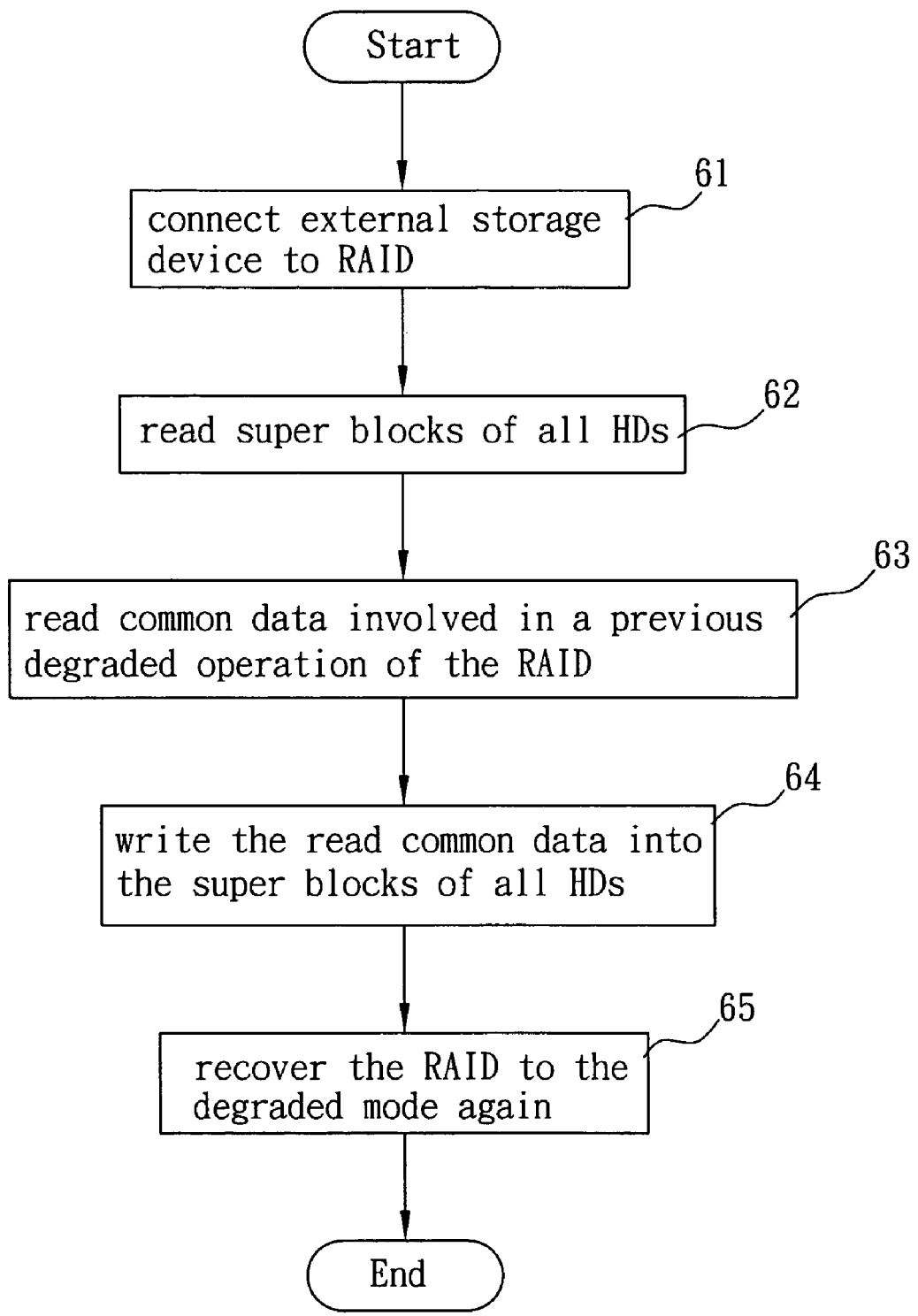
FIG. 7 is a flowchart depicting a process for performing a super block recovery by the RAID according to the invention.

Referring to FIG. 5 again, in the embodiment the HDs 51 and 52 fail and the HD 53 operates normally. As such, the RAID crashes. A process for performing a super block recovery by the RAID according to the invention is illustrated in FIG. 7. The process comprises the following steps:

In step 61, an external storage device (e.g., HD, CD-ROM, or tape drive) is connected to the RAID and the RAID controller is commanded to treat the external storage device as a HD of the RAID;

In step 62, super blocks of all HDs are read;

In step 63, the number of HDs and time being involved in a previous operation and stored in all super blocks are compared with each other. Further, common data involved in the previous degraded operation of the RAID is read;

In step 64, the read common data is written into the super blocks of all HDs; and In step 65, a configuration of the RAID is recovered into a degraded mode again after writing the common data into the super blocks of all HDs.

Figure 8:
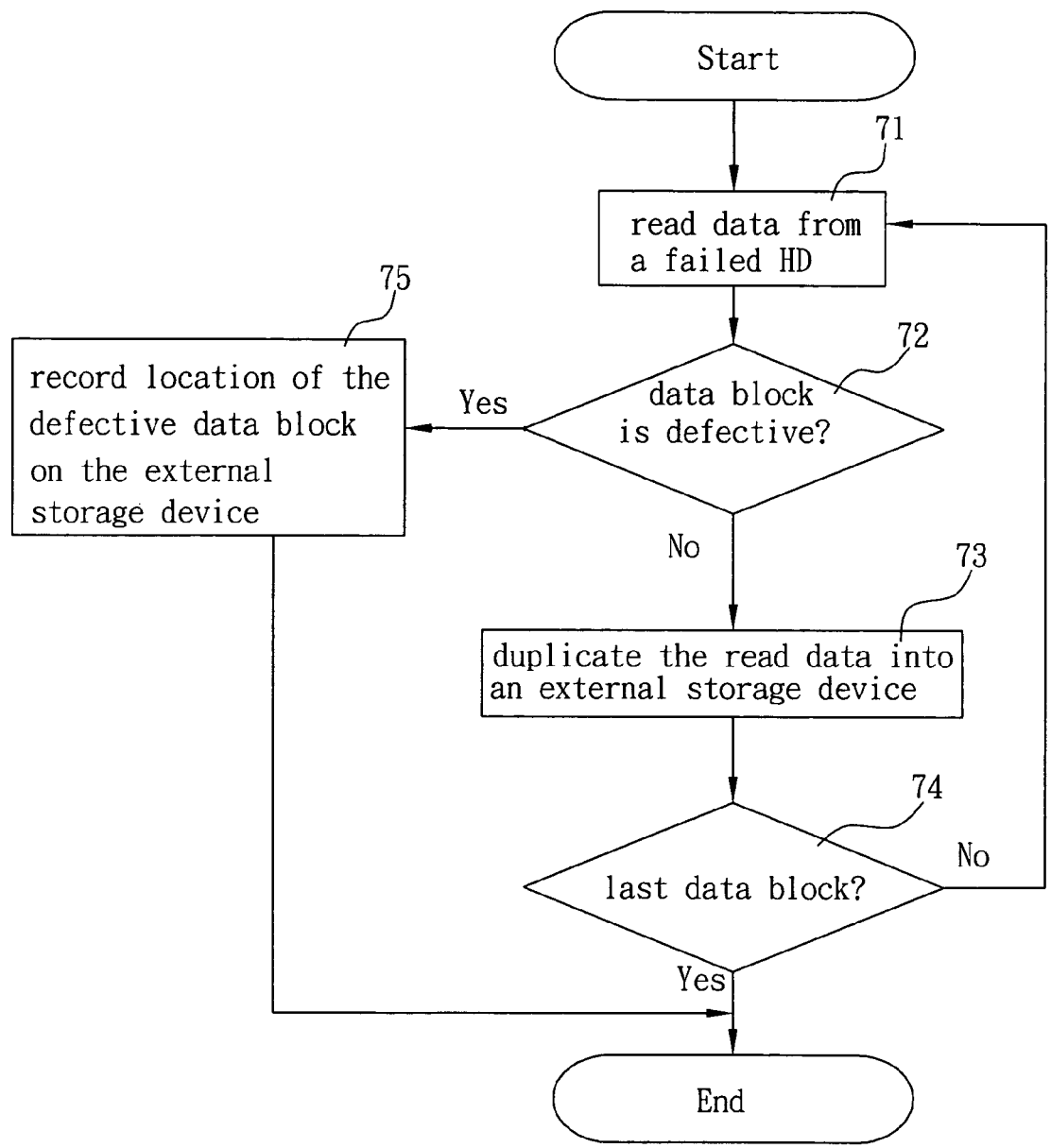
FIG. 8 is a flowchart depicting a process for saving intact data of a failed HD on an external storage device by the RAID according to the invention.

Referring to FIG. 8, after performing the super block recovery of the RAID and recovering the configuration of the RAID to a degraded mode, the invention further performs a process for saving intact data of a failed HD on an external storage device. The process comprises the following steps:

In step 71, each of a plurality of data blocks of a failed HD is read;

In step 72, it is determined whether a data block is defective or not; if yes, the process jumps to step 75; otherwise, the process goes to step 73;

In step 73, the read data of the data block is sequentially copied into the external storage device;

In step 74, it is determined whether a last data block is reached or not; if yes, the process ends successfully; otherwise, the process loops back to step 71 for reading data of next data block; and In step 75, location of the defective data block is sequentially recorded on the external storage device.

It is contemplated by the invention that it is possible of saving intact data of any failed HD on the external storage device in case of the failure of two HDs of the RAID.

Figure 9:
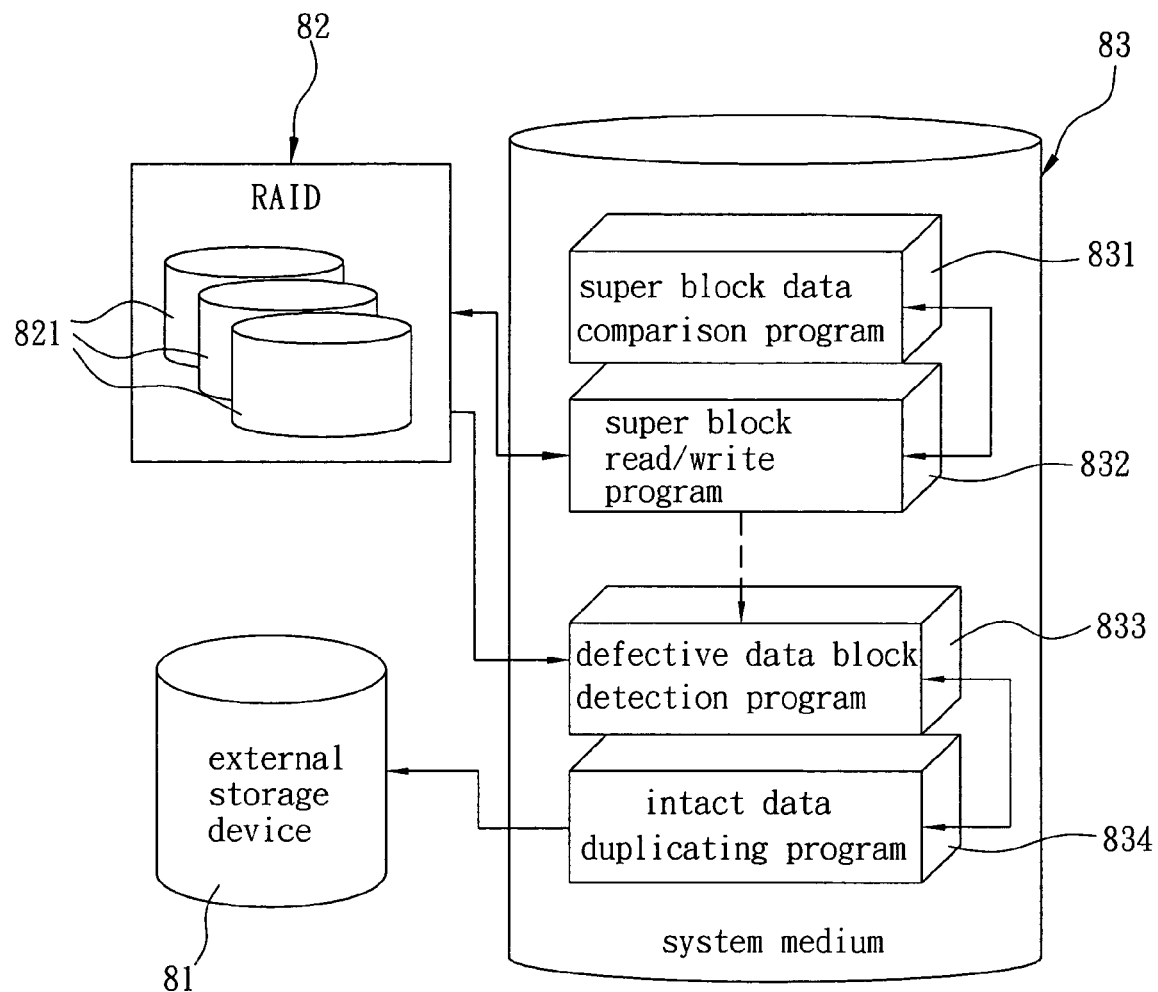
FIG. 9 is a block diagram of a data reconstructing system incorporating the RAID according to the first preferred embodiment of the invention.

Referring to FIG. 9, as contemplated by the invention a data reconstructing system incorporating the RAID according to the first preferred embodiment of the invention is shown. The data reconstructing system is adapted to save intact data of a failed HD on an external storage device as detailed below. The system comprises a RAID 82, as a logical disk drive assembly, including at least three (3) HDs 821 and a RAID controller (not shown); an external storage device 81; and a system medium (e.g., a computer or a server) 83 connected to the RAID 82 and the external storage device 81 respectively. The system medium 83 comprises a super block read/write program 832 for reading data from super blocks of the HDs 821 or writing data into the same; a super block data comparison program 831 linked with the super block read/write program 832 for comparing data from the super blocks of the HDs 821 read by the super block read/write program 832 with each other, reading common data involved in the previous degraded operation of the HDs 821, and writing the read common data into the super blocks of all HDs 821 by running the super block read/write program 832; a defective data block detection program 833 for reading data from data blocks of the HDs 821 and detecting whether the read data is defective or not; and an intact data duplicating program 834 linked with the defective data block detection program 833 for duplicating data of intact data blocks of the HDs 821 into the external storage device 81, and sequentially recording location of the defective data block on the external storage device 81.

Figure 10:
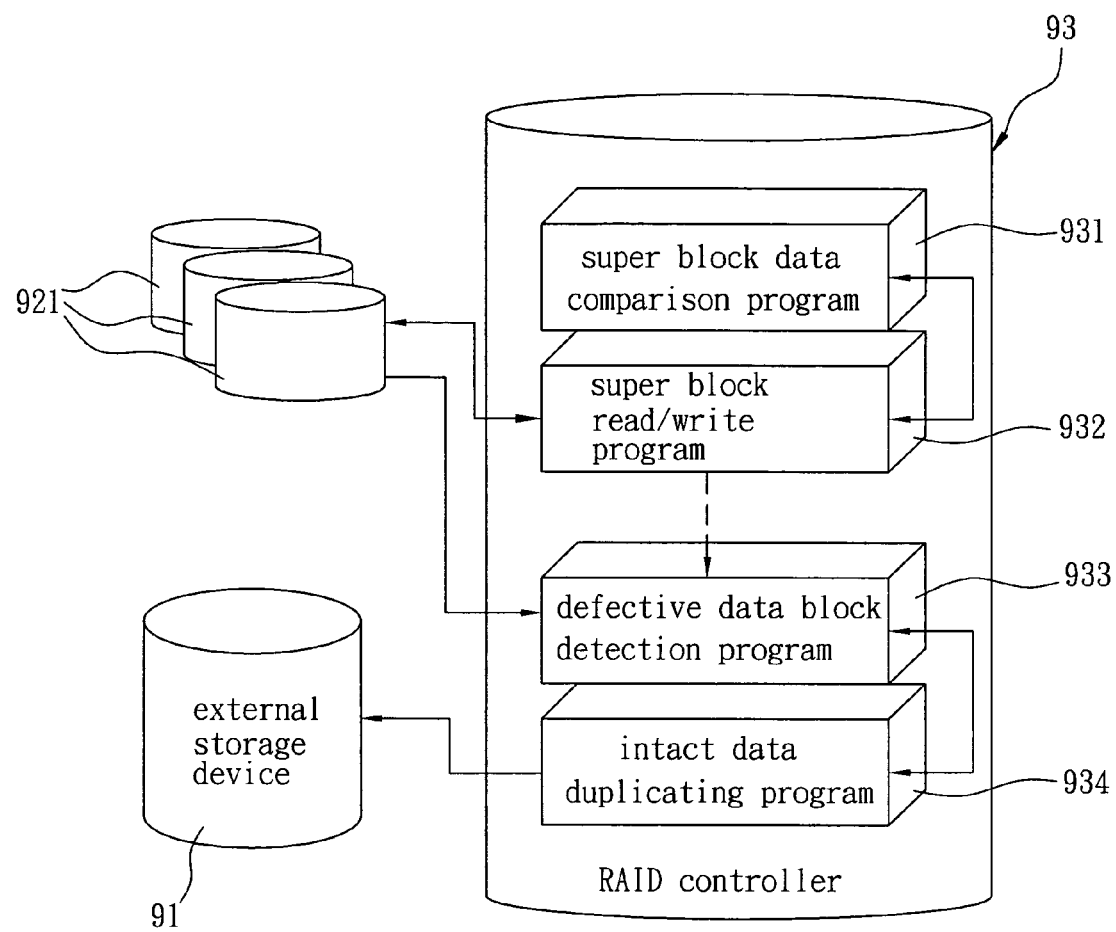
FIG. 10 is a block diagram of a data reconstructing system incorporating a RAID according to a second preferred embodiment of the invention.

It is noted that the above data reconstructing system only incorporating the RAID according to the first preferred embodiment of the invention. Other data reconstructing systems incorporating the RAID according to other preferred embodiments of the invention are also possible in practice. For example, referring to FIG. 10, a data reconstructing system incorporating a RAID according to a second preferred embodiment of the invention is shown. The system comprises at least three (3) HDs 921; an external storage device 91; and a RAID controller 93 connected to the HDs 921 and the external storage device 91 respectively. The RAID controller 93 comprises a super block read/write program 932 for reading data from super blocks of the HDs 921 or writing data into the same; a super block data comparison program 931 linked with the super block read/write program 932 for comparing data from the super blocks of the HDs 921 read by the super block read/write program 932 with each other, reading common data involved in the previous degraded operation of the HDs 921, and writing the read common data into the super blocks of all HDs 921 by running the super block read/write program 932; a defective data block detection program 933 for reading data from data blocks of the HDs 921 and detecting whether the read data is defective or not; and an intact data duplicating program 934 linked with the defective data block detection program 933 for duplicating data of intact data blocks of the HDs 921 into the external storage device 91, and sequentially recording location of the defective data block on the external storage device 91.

In treat of the above, in case of two HDs of RAID being failed and the RAID being crashed, the invention can reconstruct data of the RAID by performing the steps of utilizing data stored in super blocks of all HDs in cooperation with an external storage device 81 or 91, recovering the configuration of the RAID to a previous degraded mode, reading data from data blocks of the HDs, detecting whether read data is defective or not, duplicating data of intact data blocks of the HDs into the external storage device 81 or 91, and sequentially recording location of the defective data block on the external storage device 81 or 91.

While the invention herein disclosed has been described by means of specific embodiments, numerous modifications and variations could be made thereto by those skilled in the art without departing from the scope and spirit of the invention set forth in the claims.

What is claimed is:

1. A method for reconstructing data in case of the failure of two HDs (Hard Disks) of a RAID (Redundant Array of Independent Disks), wherein the RAID includes at least three HDs and a RAID controller, file data is divided into strips stored on different data blocks of the different HDs respectively, comprising the steps of:
   reading super blocks of all the HDs for obtaining number of the HDs and time of a previous operation of the RAID stored on the super blocks of all the HDs;
   comparing the number of the HDs and the time of the previous operation of the RAID obtained from all the HDs with each other;
   reading common data used in a previous degraded mode of the RAID;
   writing the common data used in the previous degraded mode into the super blocks of all the HDs;
   recovering a configuration of the RAID into a degraded mode again;
   reading data from the data blocks of defective HDs;
   detecting whether any of the data blocks is defective;
   reading intact data from the data blocks of the defective HDs and duplicating the intact data into an external storage device connected to the RAID; and
   recording location of the defective data block into the external storage device.

2. The method of claim 1, wherein the external storage device is a HD.

3. The method of claim 1, wherein the external storage device is a CD-ROM.

4. The method of claim 1, wherein the external storage device is a tape drive.

5. A system for reconstructing data in case of a RAID crash, comprising:
   a RAID, which is a logical disk drive assembly, including at least three HDs and a RAID controller, wherein file data is divided into strips stored on different data blocks of the different HDs respectively;
   an external storage device connected to the RAID; and
   a system medium connected to the RAID and the external storage device, comprising:
   a super block read/write program for reading super blocks of all the HDs to obtain number of the HDs and time of a previous operation of the RAID stored on the super blocks of all the HDs or writing data into the super blocks;
   a super block data comparison program linked with the super block read/write program for comparing the number of the HDs and the time of the previous operation of the RAID obtained from all the HDs by the super block read/write program with each other, reading common data used in a previous degraded mode of the RAID, and writing the common data used in the previous degraded mode into the super blocks of all the HDs by running the super block read/write program;
   a defective data block detection program for reading data from the data blocks of defective HDs and detecting whether any of the data blocks is defective or not; and
   an intact data duplicating program linked with the defective data block detection program for duplicating intact data from the data blocks of the defective HDs into the external storage device, and recording location of defective data block into the external storage device.

6. The system of claim 5, wherein the system medium is a computer.

7. The system of claim 5, wherein the system medium is a server.

8. The system of claim 5, wherein the external storage device is a HD.

9. The system of claim 5, wherein the external storage device is a CD-ROM.

10. The system of claim 5, wherein the external storage device is a tape drive.

11. A system for reconstructing data in case of a RAID crash, comprising:
    at least three HDs, wherein file data is divided into strips stored on different data blocks of the different HDs respectively;
    an external storage device; and
    a RAID controller connected to the HDs and the external storage device, wherein the RAID controller comprises:
    a super block read/write program for reading data from super blocks of the HDs to obtain number of the HDs and time of a previous operation of the RAID stored on the super blocks of all the HDs or writing data into the super blocks;
    a super block data comparison program linked to the super block read/write program for comparing the number of the HDs and the time of the previous operation of the RAID obtained from all the HDs by the super block read/write program with each other, reading common data used in a previous degraded mode of the RAID, and writing the common data used in the previous degraded mode into the super blocks of all the HDs by running the super block read/write program;
    a defective data block detection program for reading data from the data blocks of defective HDs and detecting whether any of the data blocks is defective or not; and
    an intact data duplicating program linked with the defective data block detection program for duplicating intact data from the data blocks of the defective HDs into the external storage device, and recording location of the defective data block into the external storage device.

12. The system of claim 11, wherein the external storage device is a HD.

13. The system of claim 11, wherein the external storage device is a CD-ROM.

14. The system of claim 11, wherein the external storage device is a tape drive.

* * * * *